United States Patent [19]

Hendriks

[11] 4,140,012
[45] Feb. 20, 1979

[54] SMALL PIPE FLOWMETER

[75] Inventor: Henry L. Hendriks, La Puente, Calif.

[73] Assignee: Envirotech Corporation, Menlo Park, Calif.

[21] Appl. No.: 849,159

[22] Filed: Nov. 7, 1977

[51] Int. Cl.² ............................................. G01F 1/66
[52] U.S. Cl. ................................. 73/194 A; 73/273
[58] Field of Search ............................. 73/194 A, 273

[56] References Cited

U.S. PATENT DOCUMENTS

| 470,814 | 3/1892 | Abrahams | 73/231 |
|---|---|---|---|
| 1,298,532 | 3/1919 | Mapelsden | 73/211 |
| 2,991,650 | 7/1961 | Katzenstein | 73/194 |
| 3,071,003 | 1/1963 | Brette | 73/273 X |
| 3,964,309 | 6/1976 | Husse et al. | 73/194 |
| 4,014,210 | 3/1977 | Husse et al. | 73/194 |

FOREIGN PATENT DOCUMENTS 121572  3/1958  U.S.S.R. ................................ 73/194

Primary Examiner—Herbert Goldstein
Attorney, Agent, or Firm—William S. Bernheim; Robert E. Krebs

[57] ABSTRACT

An assembly for an ultrasonic flowmeter apparatus includes a housing having first and second opposite ends, an inlet and an outlet, a tube within the housing to define a passage in the housing, a wall within the housing to support the tube and to partition the housing into first and second plenums which are in flow communication through the passage of the tube and ultrasonic transducers mounted at the opposite ends of the housing to transmit ultrasonic signals in an axial direction through the tube.

9 Claims, 2 Drawing Figures

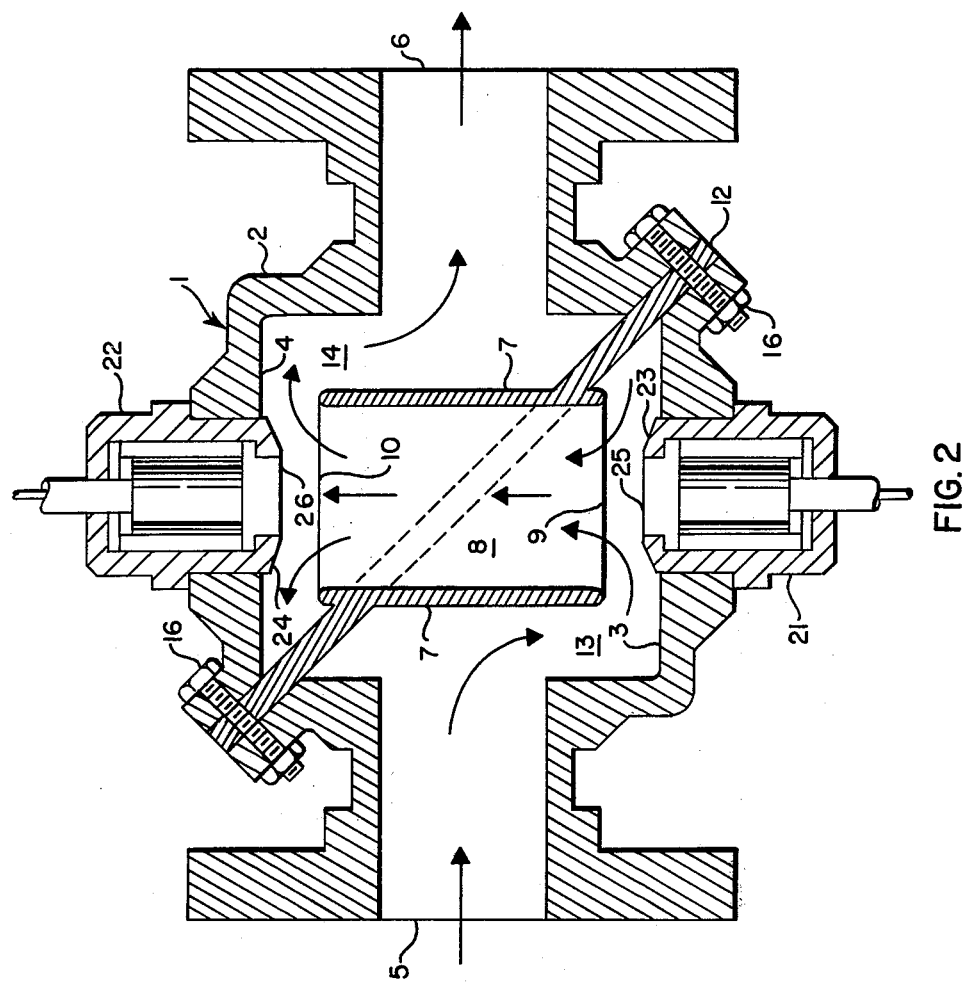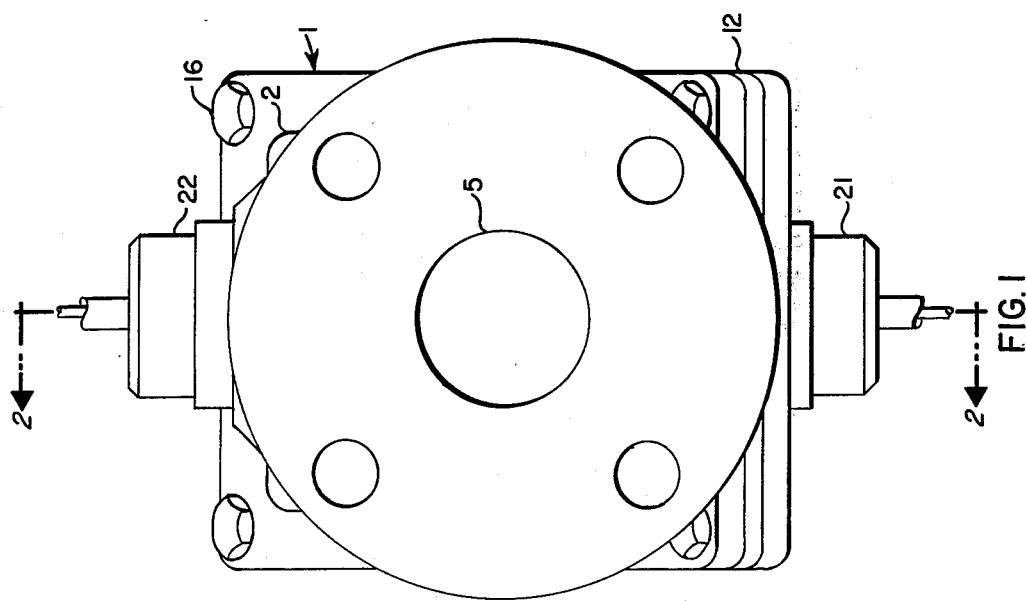

SMALL PIPE FLOWMETER

BACKGROUND

1. Field of the Invention

The invention relates in general to an apparatus for ultrasonic measurements of liquid flow.

2. State of the Art

Ultrasonic devices are known for measuring flow in small pipelines having inside diameters less than 12 cm. Such devices generally measure flow velocity and from velocity derive flow. U.S. Pat. No. 3,817,098 to Brown discloses a number of configurations for such devices.

The Brown configurations illustrate a number of disadvantages heretofore of such devices. In one configuration transducers are positioned at a spaced interval along a pipeline. To so position the transducers requires a length of straight pipeline longer than the spaced interval. Further, the size and shape of these transducers are important as the transducers form obstructions to flow in the pipeline. In another configuration transducers are individually positioned in a side arm set back from a flowpath. As so positioned, these transducers are not obstructive to flow but flow in the arms is static which can allow bubbles or deposits to collect on the transducers and interfere with transmission of signals by the transducers.

OBJECTS OF THE INVENTION

An object of this invention is to provide an assembly for interposing an ultrasonic flowmeter apparatus in a small diameter pipe and having an ultrasonic signal path perpendicular to and independent in signal path length of the distance necessary along a pipeline for interposing the assembly. A further object is to provide an assembly with ultrasonic transducers projecting into liquid plenums provided in the assembly and through which the liquid being measured flows so that the flow about the projections of the transducers is not static.

Yet another object is to provide an assembly for an ultrasonic flowmeter in which for a given flow the flow velocity along the signal path can be adjusted.

BRIEF DESCRIPTION OF THE DRAWINGS

Further objects and advantages of the invention may be readily ascertained by reference to the following description and appended drawings, which are offered by way of description and not in limitation of the invention, the scope of which is defined in the appended claims.

In the drawings:

FIG. 1 is a side view of an assembly for an ultrasonic flowmeter according to the present invention.

FIG. 2 is a cross section of the assembly of FIG. 1 taken along the line 2—2.

PREFERRED EMBODIMENT OF THE INVENTION

Referring to the FIGS, an assembly 1 for an ultrasonic flowmeter includes a rectangular housing 2 including first and second opposite ends 3 and 4 and an inlet 5 for admitting a flow of liquid to the housing 2 and an outlet 6 for discharging the flow from the housing 2. It is understood that the housing 2 can be elongated or tubular.

Preferably, the inlet 5 and outlet 6 are on opposite sides of the housing 2 and concentric so that the assembly 1 can be interposed in a straight length of a pipeline.

Mounted within the housing 2 is a tube 7 which has circular interior and exterior cross sections and defines an elongated straight passage 8. Preferably, the tube 7 extends in a direction perpendicular to the axis on which the inlet 5 and outlet 6 are concentric. The tube 7 has first and second open ends 9 and 10 spaced respectively from the opposite ends 3 and 4 of the housing 2.

A non-foraminous wall 12 extends within the housing 2, supports the tube 7 and partitions the space enclosed by the housing 2 into separate first and second plenums 13 and 14 which are in flow communication with one another within the housing 2 only through the passage 8 of the tube 7. The first plenum 13 is in direct flow communication with the inlet 5 and is formed relative to the adjacent first open end 9 of the tube 7 so as to provide generally uniform flow into the tube 7. The second plenum 14 is in direct flow communication with the outlet 6 and is formed relative to the adjacent second open end 10 of the tube 7 so as to receive generally uniform flow from the tube 7.

Preferably, the cross-sectional flow areas of the passage 8, inlet 5, and outlet 6 are equal. Further, the wall 12 is preferably mounted to extend diagonally across the housing 2 at an angle of about 45° relative the longitudinal axis of the tube 7. The cross-sectional flow area of the passage 8 can be changed by loosening bolts 16 so that the assembly 2 can be separated into two halves along the line of the wall 12. When separated, a different wall 12, supporting a tube 7 having a different flow area, can be substituted and the halves of the assembly 2 rebolted together. For a given flow, the flow velocity will vary inversely with the flow area.

A means, for example a threaded fitting, is provided for mounting ultrasonic transducers 21 and 22 at the respective opposite ends 3 and 4 of the housing 2. The transducers 21 and 22 are mounted in relative upstream and downstream positions with respect to flow passing through passage 8 so as to transmit ultrasonic signals in an axial direction through the tube 7.

In the preferred embodiment, the upstream and downstream transducers 21 and 22 are mounted to have projections 23 and 24 into the housing 2 at the respective ends 3 and 4 into the respective first and second plenums 13 and 14 such that annuluses are formed about the projections 23 and 24. The annuluses serve to increase the liquid flow over transmitting faces 25 and 26 of the respective transducers 21 and 22.

As an example, the distance between transducers 21 and 22 ranges from 12 to 18 cm. The length of the tube 7 ranges from 10 to 13 cm. The cross-sectional flow area of the tube 7 the inlet 5 and the outlet 6 range from 2 sq cm to 80 sq cm. The cross-sectional area of a suitable ultrasonic transducer is about 4 sq. cm.

In operation, the housing 2 is interposed in a pipeline. The liquid flowing in the pipeline is admitted to the housing 2 through inlet 5 and flows toward opposite end 3. At the end 9 of the tube 7, the liquid converges inward and reverses its direction of flow to flow through the passage 8. At the other end 10 of the tube 7, the liquid diverges outward and reverses its direction of flow to flow towards the outlet 6 for discharge to the pipeline.

Electronic circuitry, not shown, is connected to the upstream and downstream ultrasonic transducers 21 and 22 to apply and receive signals alternatively at the upstream and downstream transducers 21 and 22, which signals are transmitted through the liquid in passage 8 of the tube 7. Suitable electronic circuitry for use with the ultrasonic transducers to generate a flow measurement is described for example in U.S. Pat. No. 3,894,431 to Muston and Looseman and U.S. Pat. No. 3,818,757 to Brown.

Thus it is seen that the invention described herein provides a signal path perpendicular to and independent in length of the distance needed for interposing the assembly in a pipeline. Further, the projections 23 and 24 of the transducers 21 and 22 increase liquid flow across the faces 25 and 26 of the transducers 21 and 22 to remove bubbles or deposits which can interfere with the transmission of signals.

I claim:

1. An assembly for interposing an ultrasonic flowmeter apparatus in a small diameter pipeline comprising:
   a. a housing having first and second halves including first and second opposite ends respectively and said housing including an inlet for admitting a flow of liquid from a pipe to said first half and an outlet for discharging a flow of liquid from said housing from said second half;
   b. an open-ended tube supported within said housing to define an elongated straight passage therein, said tube being supported with its first and second open ends spaced respectively from said opposite ends of said housing;
   c. a wall within said housing separable from said first and second halves, said wall being the sole support of said tube, to partition the space enclosed by said housing into separate first and second plenums which are in flow communication through said open-ended tube;
   d. said first plenum being in direct flow communication with said inlet and formed relative to the adjacent first end of said tube so as to provide generally uniform flow to said tube;
   e. said second plenum being in direct flow communication with said outlet and formed relative to the adjacent second end of said tube so as to receive generally uniform flow from said tube; and
   f. a means for mounting ultrasonic transducers at said opposite ends of said housing to transmit ultrasonic signals in an axial direction through said tube.

2. An assembly according to claim 1 wherein said wall extends at an angle of about 45° with respect to the longitudinal axis of said tube.

3. An assembly according to claim 1 wherein said wall extends diagonally across the space enclosed by said housing.

4. An assembly according to claim 1 wherein said tube has circular interior and exterior cross sections.

5. An assembly according to claim 1 wherein the elongated passage of said tube is positioned within said housing so that the direction of flow through the passage is perpendicular to the direction of flow through the inlet of said housing.

6. An assembly according to claim 1 wherein said inlet and said outlet are concentric.

7. An assembly according to claim 1 further including first and second ultrasonic transducer means mounted by said mounting means at said opposite ends of said housing.

8. An assembly according to claim 7 wherein said first and second transducer means have projections into said housing at their respective opposite ends such that first and second annuluses are formed within said housing about the respective projections of said first and second transducer means.

9. An assembly according to claim 7 further including electronic circuitry means to apply and receive signals alternatively at said transducers.

* * * * *